(12) United States Patent  (10) Patent No.: US 10,285,111 B2
Chang et al.  (45) Date of Patent: May 7, 2019

(54) METHOD AND APPARATUS FOR COMMUNICATION BETWEEN USER EQUIPMENTS IN WIRELESS COMMUNICATION SYSTEM

(71) Applicant: Samsung Electronics Co., Ltd., Suwon-si, Gyeonggi-do (KR)

(72) Inventors: Young-Bin Chang, Anyang-si (KR); Kyung-Kyu Kim, Suwon-si (KR); Seung-Hoon Park, Seoul (KR); Sang-Kyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 14/120,269

(22) Filed: May 14, 2014

(65) Prior Publication Data

US 2014/0341121 A1  Nov. 20, 2014

(30) Foreign Application Priority Data

May 14, 2013 (KR) .................. 10-2013-0054541
Jul. 9, 2013 (KR) .................. 10-2013-0080606

(51) Int. Cl.
*H04W 40/24* (2009.01)
*H04W 8/00* (2009.01)

(52) U.S. Cl.
CPC ......... *H04W 40/246* (2013.01); *H04W 8/005* (2013.01)

(58) Field of Classification Search
None
See application file for complete search history.

(56) References Cited

U.S. PATENT DOCUMENTS

| 6,845,397 | B1* | 1/2005 | Lavian | H04L 29/06 709/230 |
|---|---|---|---|---|
| 2004/0218579 | A1* | 11/2004 | An | H04L 29/06 370/349 |
| 2005/0058109 | A1 | 3/2005 | Ekberg | |
| 2006/0259598 | A1* | 11/2006 | Kim | H04W 36/005 709/222 |
| 2007/0072611 | A1* | 3/2007 | Feder | H04W 36/005 455/436 |

(Continued)

FOREIGN PATENT DOCUMENTS

| CN | 101496430 A | 7/2009 |
|---|---|---|
| CN | 102084321 A | 6/2011 |

(Continued)

OTHER PUBLICATIONS

XP050708112, "Solution for direct discovery and communication", SA WG2 Meeting #96; San Diego, USA; Apr. 2, 2013.

(Continued)

*Primary Examiner* — Jeffrey M Rutkowski
*Assistant Examiner* — Andre G Tacdiran
(74) *Attorney, Agent, or Firm* — Jefferson IP Law, LLP

(57) ABSTRACT

A method and an apparatus for direct communication between User Equipments (UEs) in a wireless communication system are provided. A method for communicating with a second UE by a first UE in the wireless communication system includes generating a discovery code used for communicating with the second UE, and transmitting the generated discovery code to one middle layer among a plurality of layers.

13 Claims, 12 Drawing Sheets

(56) References Cited

U.S. PATENT DOCUMENTS

| | | | |
|---|---|---|---|
| 2007/0214279 A1* | 9/2007 | Choi | H04L 65/4084 709/231 |
| 2008/0113652 A1* | 5/2008 | Liu | H04L 67/16 455/414.1 |
| 2008/0176546 A1* | 7/2008 | Devico et al. | 455/418 |
| 2008/0263013 A1 | 10/2008 | Hopkins | |
| 2009/0016255 A1* | 1/2009 | Park | H04W 8/005 370/312 |
| 2009/0259790 A1 | 10/2009 | Ng | |
| 2009/0325601 A1* | 12/2009 | Park | H04W 8/005 455/456.2 |
| 2011/0199918 A1 | 8/2011 | Sampath et al. | |
| 2012/0110089 A1* | 5/2012 | Wang | H04L 45/00 709/205 |
| 2012/0163235 A1* | 6/2012 | Ho et al. | 370/254 |
| 2012/0173623 A1* | 7/2012 | Vanderveen | H04W 8/005 709/204 |
| 2012/0213220 A1* | 8/2012 | Troan | H04L 45/741 370/389 |
| 2012/0250629 A1* | 10/2012 | Mo | H04L 1/0079 370/329 |
| 2013/0016629 A1* | 1/2013 | Mallik et al. | 370/255 |
| 2013/0065620 A1 | 3/2013 | Jovicic et al. | |
| 2013/0073840 A1* | 3/2013 | Kim | G06F 9/4406 713/2 |
| 2013/0205012 A1* | 8/2013 | Lee | H04L 12/4035 709/224 |
| 2013/0301500 A1* | 11/2013 | Koc et al. | 370/311 |
| 2014/0003373 A1* | 1/2014 | Hakola et al. | 370/329 |
| 2014/0066058 A1* | 3/2014 | Yu | H04L 67/16 455/434 |
| 2014/0092885 A1* | 4/2014 | Venkatachalam et al. | 370/338 |
| 2014/0094212 A1* | 4/2014 | Ahn et al. | 455/517 |
| 2014/0112332 A1 | 4/2014 | Park et al. | |
| 2014/0140241 A1* | 5/2014 | Ljung | H04W 12/02 370/254 |
| 2014/0153538 A1* | 6/2014 | Kuo | 370/330 |
| 2014/0194115 A1* | 7/2014 | Yang | H04W 4/008 455/426.1 |
| 2014/0198719 A1* | 7/2014 | Vanderveen | H04L 67/16 370/328 |
| 2014/0227997 A1 | 8/2014 | Kim et al. | |
| 2014/0258395 A1* | 9/2014 | Tng | H04L 67/16 709/204 |
| 2014/0315562 A1* | 10/2014 | Lim et al. | 455/450 |
| 2015/0079899 A1* | 3/2015 | Hakola | H04W 8/005 455/39 |
| 2015/0127733 A1* | 5/2015 | Ding | H04W 4/08 709/204 |
| 2015/0282143 A1* | 10/2015 | Kim | H04W 8/005 370/329 |
| 2015/0334638 A1* | 11/2015 | Kim | H04W 48/14 370/329 |
| 2015/0373705 A1* | 12/2015 | Yamasaki | H04W 72/0446 370/336 |
| 2016/0073322 A1* | 3/2016 | Gao | H04W 4/008 370/328 |
| 2017/0181206 A1* | 6/2017 | Lee | H04W 76/023 |

FOREIGN PATENT DOCUMENTS

| | | |
|---|---|---|
| KR | 2014-0051579 | 5/2014 |
| KR | 2014-0102050 | 8/2014 |
| WO | 2012-115385 A2 | 8/2012 |

OTHER PUBLICATIONS

XP050692467, 3rd Generation Partnership Project; Technical Specification Group Services and System Aspects; Study on architecture enhancements to support Proximity Services (ProSe) (Release 12); Cedex, France; Apr. 26, 2013.

XP050698258, "Discussion on network assisted D2D discovery", 3GPP TSG RAN WG1 Meeting #73; Fukuoka, Japan; May 11, 2013.

XP050697846, "General considerations for D2D discovery", 3GPP TSG-RAN1 Meeting #73; Fukuoka, Japan; May 11, 2013.

XP050708113, "Additional details for ProSe discovery", SA WG2 Meeting #96; San Diego, USA; Apr. 2, 2013.

* cited by examiner

METHOD AND APPARATUS FOR COMMUNICATION BETWEEN USER EQUIPMENTS IN WIRELESS COMMUNICATION SYSTEM

CROSS-REFERENCE TO RELATED APPLICATION(S)

This application claims the benefit under 35 U.S.C. § 119(a) of a Korean patent application filed on May 14, 2013 in the Korean Intellectual Property Office and assigned Serial number 10-2013-0054541, and a Korean patent application filed on Jul. 9, 2013 in the Korean Intellectual Property Office and assigned Serial number 10-2013-0080606, the entire disclosure of each of which is hereby incorporated by reference.

TECHNICAL FIELD

The present disclosure relates to a method and apparatus for direct communication between User Equipments (UEs) in a wireless communication system.

BACKGROUND

In a wireless communication system, if a plurality of User Equipments (UEs) are in close proximity to each other and have information indicating that they can communicate with each other, many new services may be created, one of which is referred to as a Proximity-based Service (or a ProSe service).

With the help of the ProSe service, a UE may utilize not only various social network services (e.g., a game, message transmission and file sharing between adjacent UEs), but also various-commercial services (e.g., current discount information, special discount products and coupon issuance in stores). The ProSe service may be performed from a distance, but the ProSe service may be a more useful service for a user in proximity. In order to provide the ProSe service, each UE should be aware of the fact that the UE is in proximity to a peer UE. In addition, the UE needs to receive user's interest information of another UE. In order to make it possible, a UE may directly transmit information in an application and UEs whose users are interested in the information may receive the information, and this operation is referred to as a discovery procedure. In a communication method between UEs in the wireless communication system, discovery information should be efficiently transmitted and received in the discovery procedure between UEs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for efficiently performing a discovery procedure between User Equipments (UEs) in a wireless communication system.

Another aspect of the present disclosure is to provide a method and apparatus for direct communication between UEs in a wireless communication system.

In accordance with an aspect of the present disclosure, a method for communicating with a second UE by a first UE in a wireless communication system is provided. The method includes generating a discovery code used for communicating with the second UE, and transmitting the generated discovery code to one middle layer among a plurality of layers.

In accordance with an aspect of the present disclosure, an apparatus for communicating with a second UE by a first UE in a wireless communication system is provided. The apparatus includes a controller configured to generate a discovery code used for communicating with the second UE, and a transceiver configured to transmit the generated discovery code to one middle layer among a plurality of layers.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure will now be described in detail with reference to the accompanying drawings.

Figure 1:
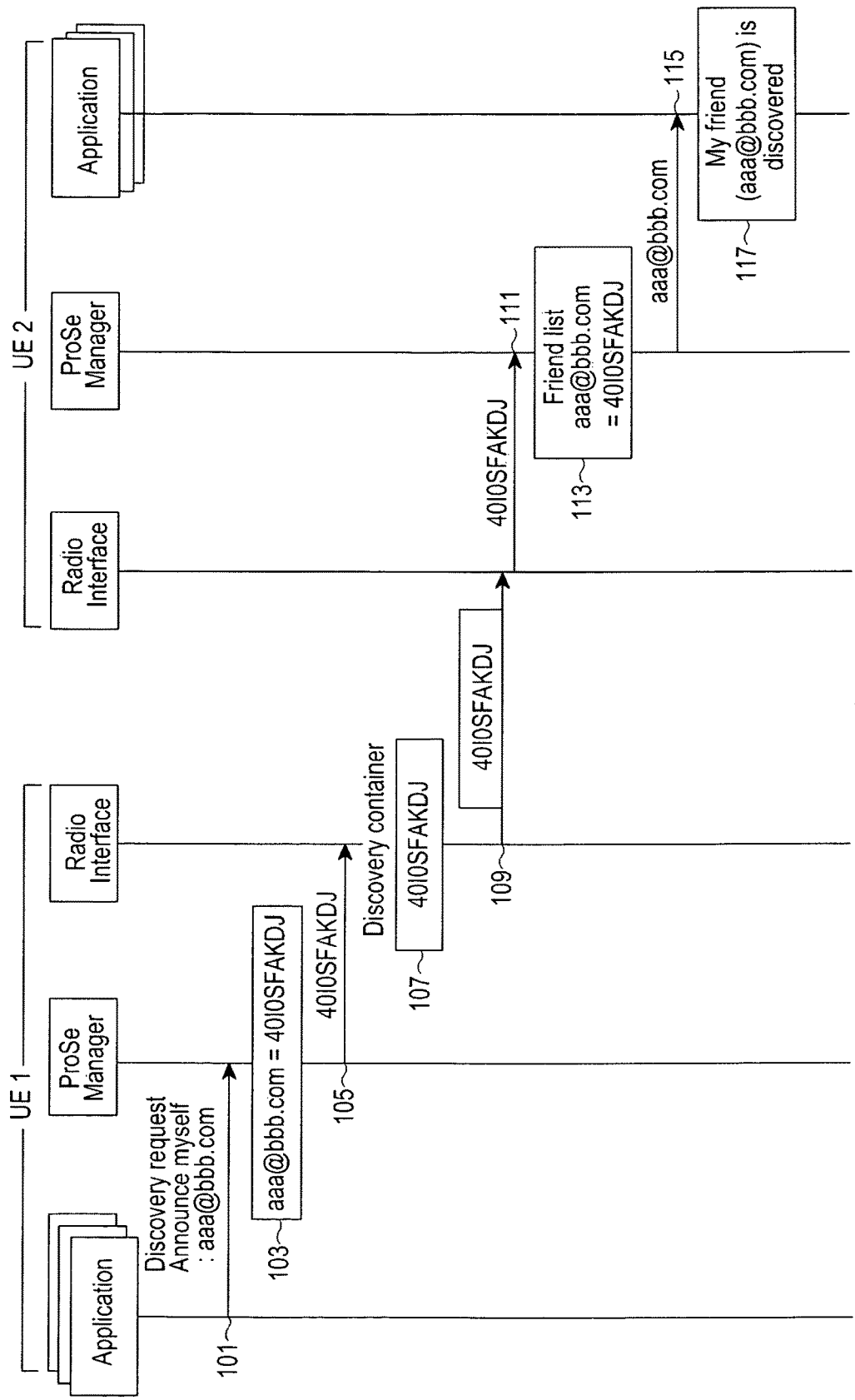
FIG. 1 illustrates a case where a User Equipment (UE) transmits discovery information in a discovery method between UEs using application information between UEs according to a first embodiment of the present disclosure.

FIG. 1 illustrates a case where a User Equipment (UE) transmits discovery information in a discovery method between UEs using application information between UEs according to a first embodiment of the present disclosure.

In a structure illustrated in FIG. 1, a UE1 may broadcast its own information defined in an application using a radio link, and other UEs may listen to the broadcasted information. As for the application, many different types of applications may exist in a UE, and for convenience of description, assumptions will be made as follows.

It will be assumed that the UE1 transmits information for discovery (hereinafter referred to as discovery information) to a UE2 and the UE2 already has the discovery information. If the UE2 does not have the discovery information, the UE2 may request the discovery information from a server in the network, which stores the discovery information. The discovery information may include any information that is defined in an application program or an application. For example, the UE1 is assumed to transmit user account information (e.g., aaa@bbb.com) of the UE1 as discovery information, and the UE2 is assumed to already have the user account information of the UE1 as information about a target device for communication with the UE1. If the UE2 cannot find the aaa@bbb.com information from a device list, the UE2 may disregard the information, and if the aaa@bbb.com information is part of the user information of the UE1 that the UE2 already has, the UE2 may inquire of the server in the network whether the UE2 is really a target device or not.

A discovery procedure in the UE1 and the UE2 is as follows.

In operation 101, the UE1 may transmit user account information (e.g., aaa@bbb.com) of the UE1 to its Proximity-based Service (ProSe) manager that is responsible for a ProSe service in an application of the UE1. The application refers to a ProSe application program that a user device can download, and the ProSe manager is a management program that controls a plurality of such application programs.

The ProSe manager may convert the aaa@bbb.com information into a discovery code such as "4010SFAKDJ" in operation 103. The reason for converting aaa@bbb.com into a discovery code is because if aaa@bbb.com is transmitted intact, the user information may be leaked, causing the privacy problems.

After converting aaa@bbb.com into the discovery code such as "4010SFAKDJ", the ProSe manager may transmit the discovery code to a radio interface in operation 105. The radio interface may include any wireless transceiver such as a cellular wireless communication system (e.g., $3^{rd}$ Generation Partnership Project (3GPP) Long Term Evolution (LTE) and the like), a Wireless Local Area Network (WLAN) (e.g., Wireless Fidelity (WiFi) and the like), Bluetooth and the like.

The radio interface may transmit the discovery code such as "4010SFAKDJ" to the UE2 by carrying it on a discovery container in operations 107 and 109.

After receiving the discovery code such as "4010SFAKDJ" using the radio interface in operation 109, the UE2, which is a target device of the UE1, may transmit the discovery code to a ProSe manager of the UE2 in operation 111.

In operation 113, the ProSe manager of the UE2 may convert the discovery code such as "4010SFAKDJ" into aaa@bbb.com, and if the ProSe manager of the UE2 transmits aaa@bbb.com to an application of the UE2 in operation 115, a user of the UE2 may be aware in operation 117 that the UE1 with a user account of "aaa@bbb.com" is in proximity where the UE1 can communicate with the UE2. When the ProSe manager converts the discovery code into aaa@bbb.com, the user device may have the related conversion information, or may receive a conversion rule from the server through communication with the server. Alternatively, the server may directly convert the discovery code into aaa@bbb.com and provide aaa@bbb.com to the ProSe manager of the user device.

In order to determine the discovery code "4010SFAKDJ" of the UE1, the ProSe manager of the UE2 may already have account information "aaa@bbb.com" of the UE1 in the application, and the ProSe manager may convert the account information "aaa@bbb.com" in the same way as that used in the UE1. Alternatively, the UE1 may provide the discovery code to another node defined in the network, and the UE2 may receive the discovery code. In this way, the UE2 may determine the discovery code. However, if there is a UE3 other than a target device of the UE1, the UE3 may not analyze the discovery code "4010SFAKDJ" of the UE1 even though the UE3 receives the discovery code "4010SFAKDJ", because the UE3 does not have the account information "aaa@bbb.com" in the application, thereby mitigating the privacy problems.

Figure 2:
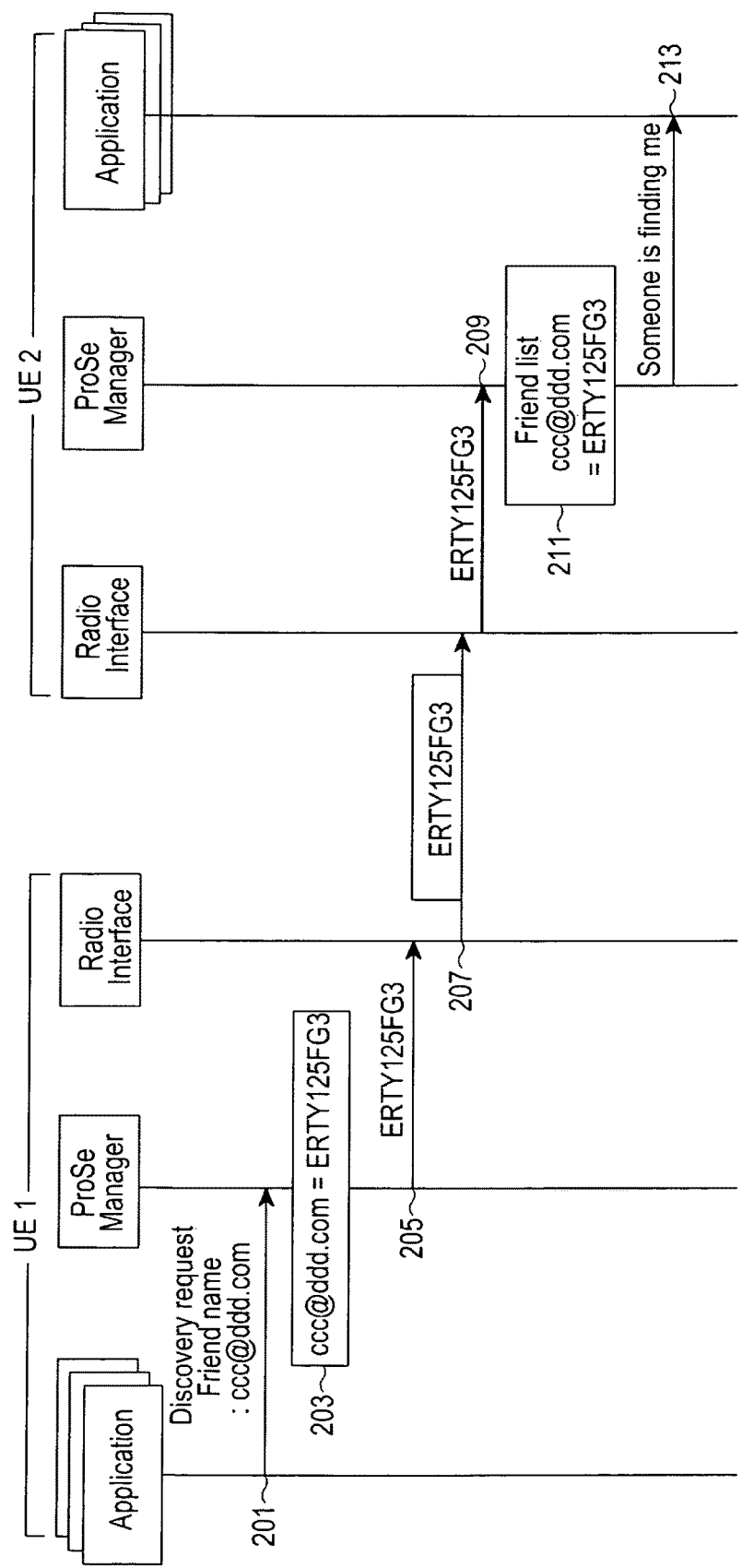
FIG. 2 illustrates a case where a UE transmits discovery information in a discovery method between UEs using application information between UEs according to a second embodiment of the present disclosure.

FIG. 2 illustrates a case where a UE transmits discovery information in a discovery method between UEs using application information between UEs according to a second embodiment of the present disclosure.

First, it will be assumed in FIG. 2 that a UE1 has information about account information "ccc@ddd.com" of a UE2 as information about a target device defined in an application. In this regard, as in FIG. 1, a user device may store account-related information therein in advance, or may be assisted by a server in the network.

Referring to FIG. 2, in operation 201, the UE1 may deliver the ccc@ddd.com information to its ProSe manager if the UE1 desires to find the UE2.

In operation 203, the ProSe manager may convert the ccc@ddd.com information into discovery code information "ERTY125FG3". In operation 205, the ProSe manager may deliver "ERTY125FG3" to a radio interface. In operation 207, the radio interface may transmit "ERTY125FG3" to a radio interface of the UE2.

The radio interface may deliver the received "ERTY125FG3" to a ProSe manager of the UE2 in operation 209, and upon receiving "ERTY125FG3", the ProSe manager may determine that "ERTY125FG3" corresponds to account information "ccc@ddd.com" of the UE2, in operation 211. In operation 213, the UE2 may be made aware of this in the application based on the account information. However, in this method, if the UE2 also transmits the same account information ccc@ddd.com, it may not be possible to distinguish the UE1 and the UE2, and thus the UE2 may know the fact that someone is finding the UE2, in operation 213, but not who is finding the UE2.

Figure 3A:
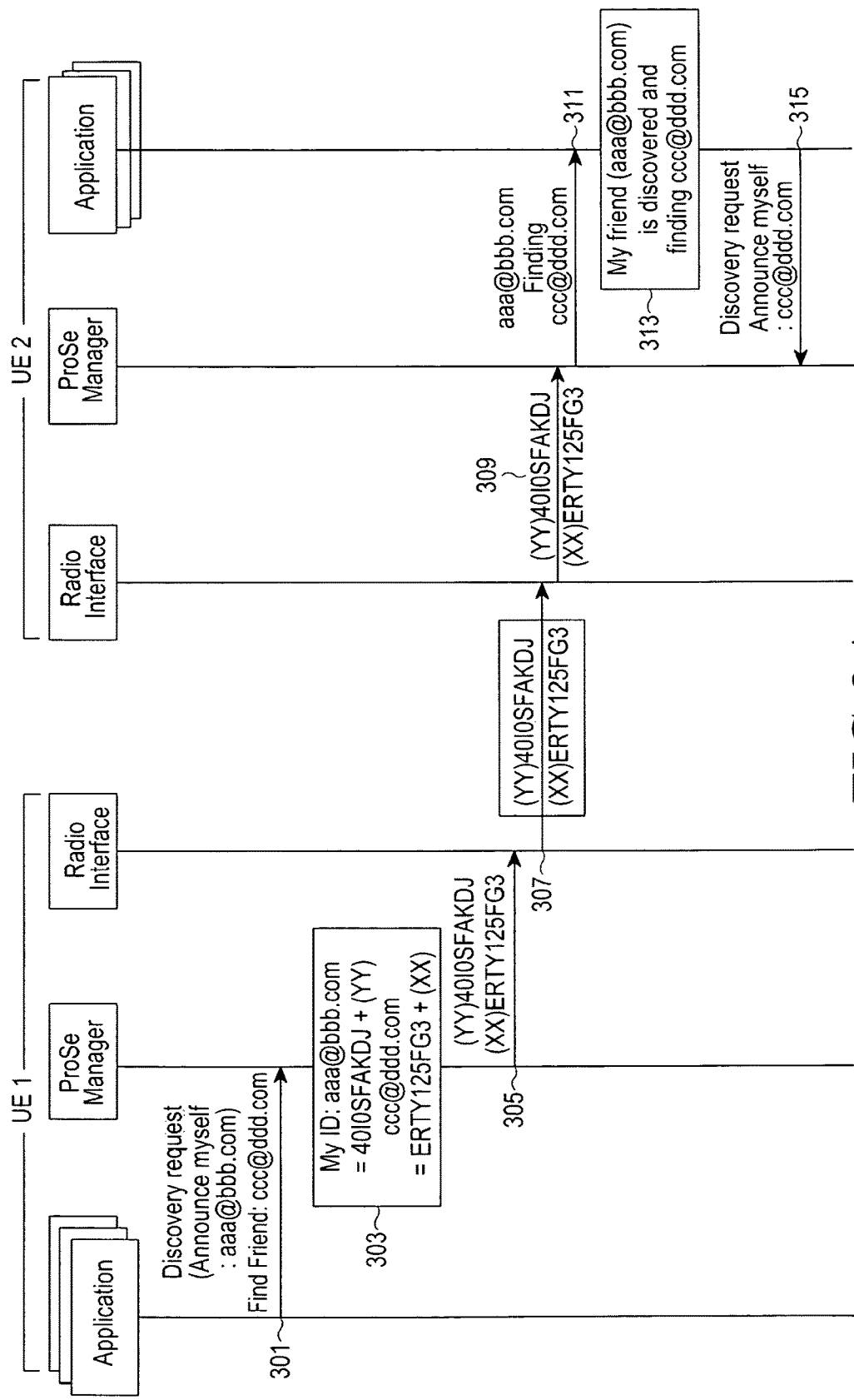
FIGS. 3A and 3B illustrate a case where a UE transmits discovery information in a discovery method between UEs using application information between UEs according to a third embodiment of the present disclosure.
Figure 3B:
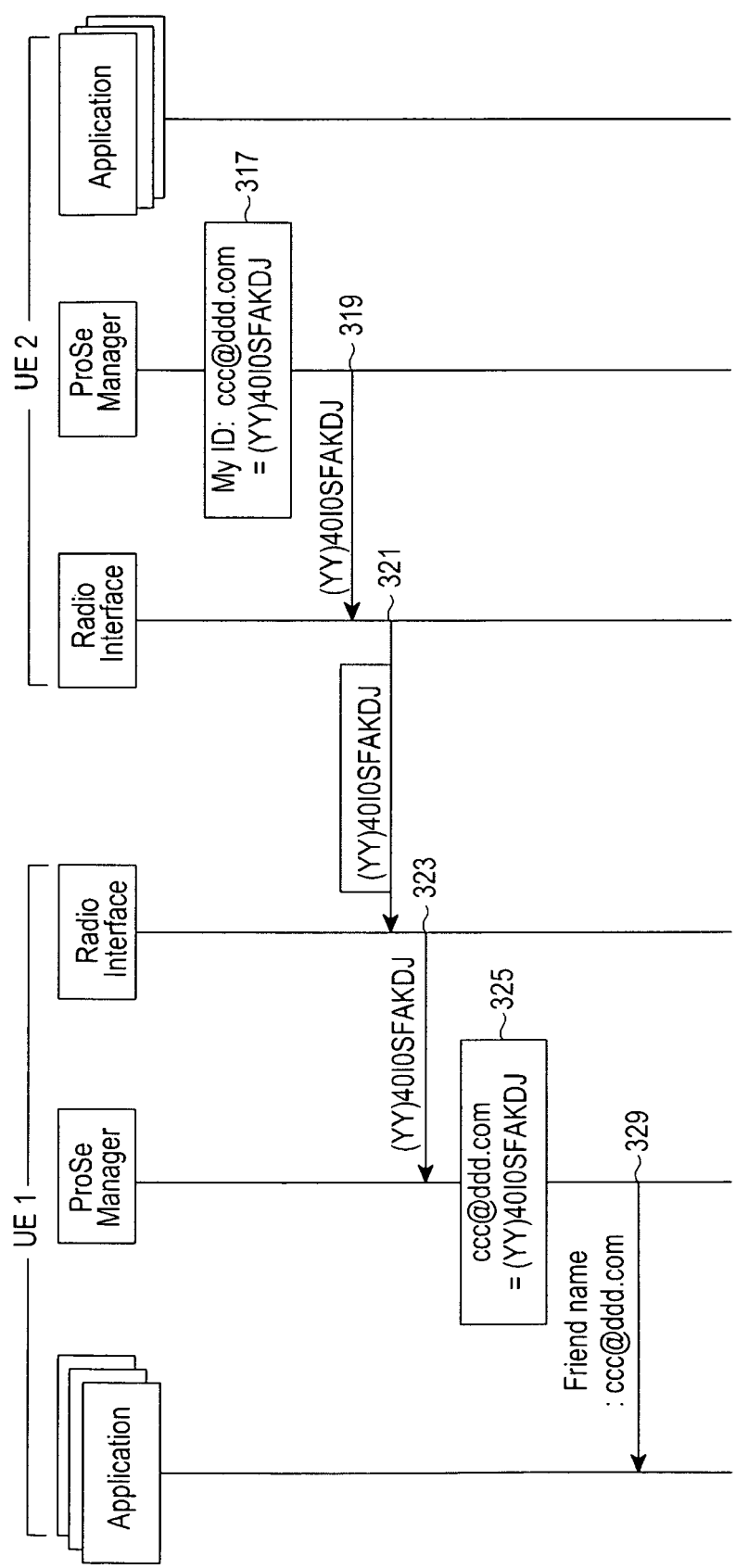

FIGS. 3A and 3B illustrate a case where a UE transmits discovery information in a discovery method between UEs using application information between UEs according to a third embodiment of the present disclosure.

Referring to FIGS. 3A and 3B, in operation 301, an application of a UE1 may transmit information about account information "ccc@ddd.com" of a UE2, which is a target device of the UE1, to its ProSe manager.

In operation 303, the ProSe manager may convert the account information of the UE2 into a discovery code. If the ProSe manager does not store account information of the UE1 in advance, the application may provide aaa@bbb.com information to the ProSe manager. In other words, in order to send both the aaa@bbb.com information, which is discovery information of the UE1, and the ccc@ddd.com information, which is account information of the UE2 that is the target device, the ProSe manager may convert the aaa@bbb.com information, which is discovery information of the UE1, and the ccc@ddd.com information, which is account information of the UE2 that is the target device into two discovery codes "4010SFAKDJ" and "ERTY125FG3" in operation 303, respectively, and transmit the two discovery codes "4010SFAKDJ" and "ERTY125FG3" to a radio interface in operation 305. In order to distinguish information about the two discovery codes before transmitting "4010SFAKDJ" and "ERTY125FG3" to the radio interface in operation 303, the ProSe manager may send the discovery codes "4010SFAKDJ" and "ERTY125FG3" by carrying thereon additional information called YY (information about my account) and XX (information about an account to be found) in operation 305, respectively. As for the additional information YY and XX, the ProSe manager may directly attach the additional information to the discovery codes "4010SFAKDJ" and "ERTY125FG3" before delivering the discovery codes to the radio interface. Alternatively, the ProSe manager may provide the additional information to the radio interface, and the radio interface may directly attach the additional information to the discovery codes.

If the UE1 transmits the discovery codes to the UE2 via the radio interface in operation 307, a radio interface of the UE2 may deliver the received discovery codes to a ProSe manager of the UE2 in operation 309.

In operation 311, the ProSe manager of the UE2 may convert the discovery code "(YY)4010SFAKDJ" into aaa@bbb.com and deliver aaa@bbb.com to an application of the UE2.

In operation 313, the application of the UE2 may inform its user (e.g., a user of the UE2) of the presence of the UE1 whose user is a friend of the UE2, and may know the fact that the UE1 is finding the UE2, based on "ccc@ddd.com" which is obtained by converting the account information "(XX)ERTY125FG3" of the UE2.

In operation 315, the application of the UE2 may deliver account information "ccc@ddd.com" of the UE2 to the ProSe manager. In order to inform the UE1 of the presence of the UE1 itself, the ProSe manager of the UE2 may convert the account information ccc@ddd.com of the UE2 into "(YY)4010SFAKDJ" in operation 317, and deliver "(YY) 4010SFAKDJ" to the radio interface of the UE2 in operation 319.

Then, the radio interface of the UE2 may deliver the received "(YY)4010SFAKDJ" to the UE1 in operation 321. As the UE1 receives "(YY)4010SFAKDJ" in operations 323, 325 and 329, the UE1 may also know the presence of the UE2. Operations 323, 325 and 329 will be apparent to those of ordinary skill in the art, so a detailed description thereof will be omitted.

Figure 4:
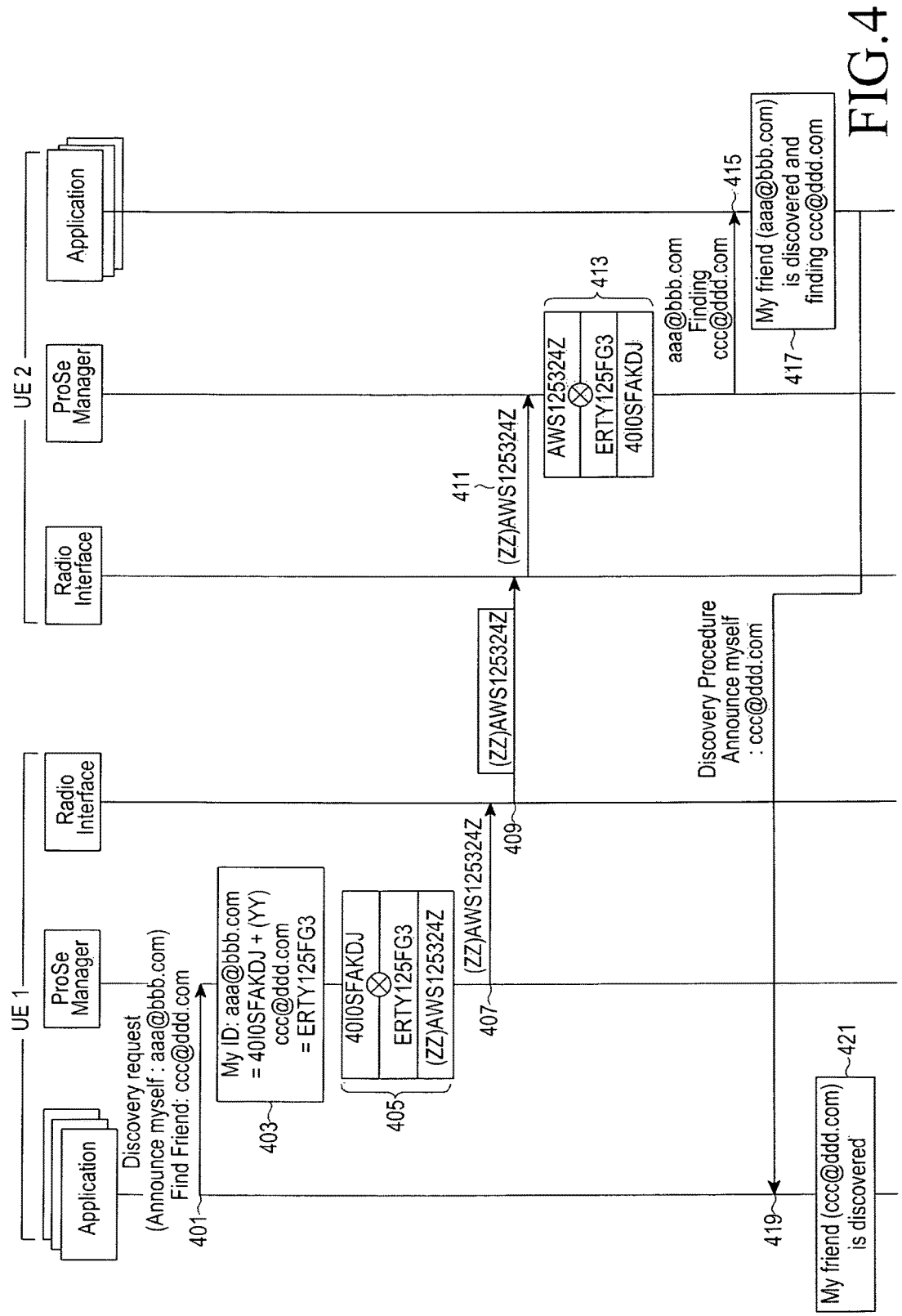
FIG. 4 illustrates a case where a UE transmits discovery information in a discovery method between UEs using application information between UEs according to a fourth embodiment of the present disclosure.

FIG. 4 illustrates a case where a UE transmits discovery information in a discovery method between UEs using application information between UEs according to a fourth embodiment of the present disclosure.

Referring to FIG. 4, in operation 401, an application of a UE1 may transmit information about account information ccc@ddd.com of a UE2 which is a target device of the UE1, to its ProSe manager.

In operation 403, like in operation 303 in FIG. 3A, in order to send both the aaa@bbb.com information, which is discovery information of the UE1, and the ccc@ddd.com information, which is account information of the UE2 that is a target device, the ProSe manager may convert the aaa@bbb.com information, which is discovery information of the UE1, and the ccc@ddd.com information, which is account information of the UE2 into two discovery codes "4010SFAKDJ" and "ERTY125FG3", respectively.

However, the ProSe manager in FIG. 4 may further perform operation 405. Specifically, in operation 405, the ProSe manager of the UE1 may generate a new code using the discovery code of the UE1 and the discovery code of the UE2. For example, a new discovery code "AWS125324" may be generated by performing Exclusive OR (XOR) operation ($\otimes$) on discovery codes "4010SFAKDJ" and "ERTY125FG3" of the UE1 and the UE2. As for a method capable of the combination, there may be a variety of methods, and all UEs may use the same method. In operation 405, the UE1 may transmit the new discovery code "AWS125324" by inserting therein information "ZZ" indicating that the new discovery code "AWS125324" is a combination of two discovery codes. The information "ZZ" may be replaced by the "XX" information in FIG. 3A.

In operation 407, the ProSe manager of the UE1 may deliver the "ZZ"-inserted "(ZZ)AWS125324" code to a radio interface. In operation 409, the radio interface may transmit the received "(ZZ)AWS125324" code to the UE2. As for the additional information ZZ, the ProSe manager may directly attach the additional information to the discovery code "(ZZ)AWS125324" before delivering the discovery code to the radio interface. Alternatively, the ProSe manager may provide the additional information to the radio interface, and the radio interface may directly attach the additional information to the discovery code.

In operation 411, the UE2 may deliver the "(ZZ) AWS125324" code received via its radio interface, to its ProSe manager.

In operation 413, after receiving the "(ZZ)AWS125324" code, the ProSe manager may obtain the code "4010SFAKDJ" of the UE1, using the discovery code "ERTY125FG3" of the UE2. For example, if the UE1 uses the XOR operation method, the UE2 may also obtain the "4010SFAKDJ" using the same XOR operation method. In operation 415, a ProSe manager of the UE2 may have information indicating that the UE1 with aaa@bbb.com is finding the UE2 with ccc@ddd.com, using the codes, and deliver aaa@bbb.com and ccc@ddd.com to an application of the UE2. In operation 417, the application of the UE2 may inform its user (e.g., a user of the UE2) of the presence of the UE1 whose user is a friend of the UE2, and may know the fact that the UE1 is finding the UE2, based on ccc@ddd.com. In operations 419 and 421, the application may inform the UE1 of the presence of the UE2 in the same way as that in operations 315 to 329 following operation 313 in FIG. 3A. If the method of combining two discovery codes is used, the privacy problems may be addresses, and radio communication resources carrying the discovery codes may be reduced to a half.

Figure 5:
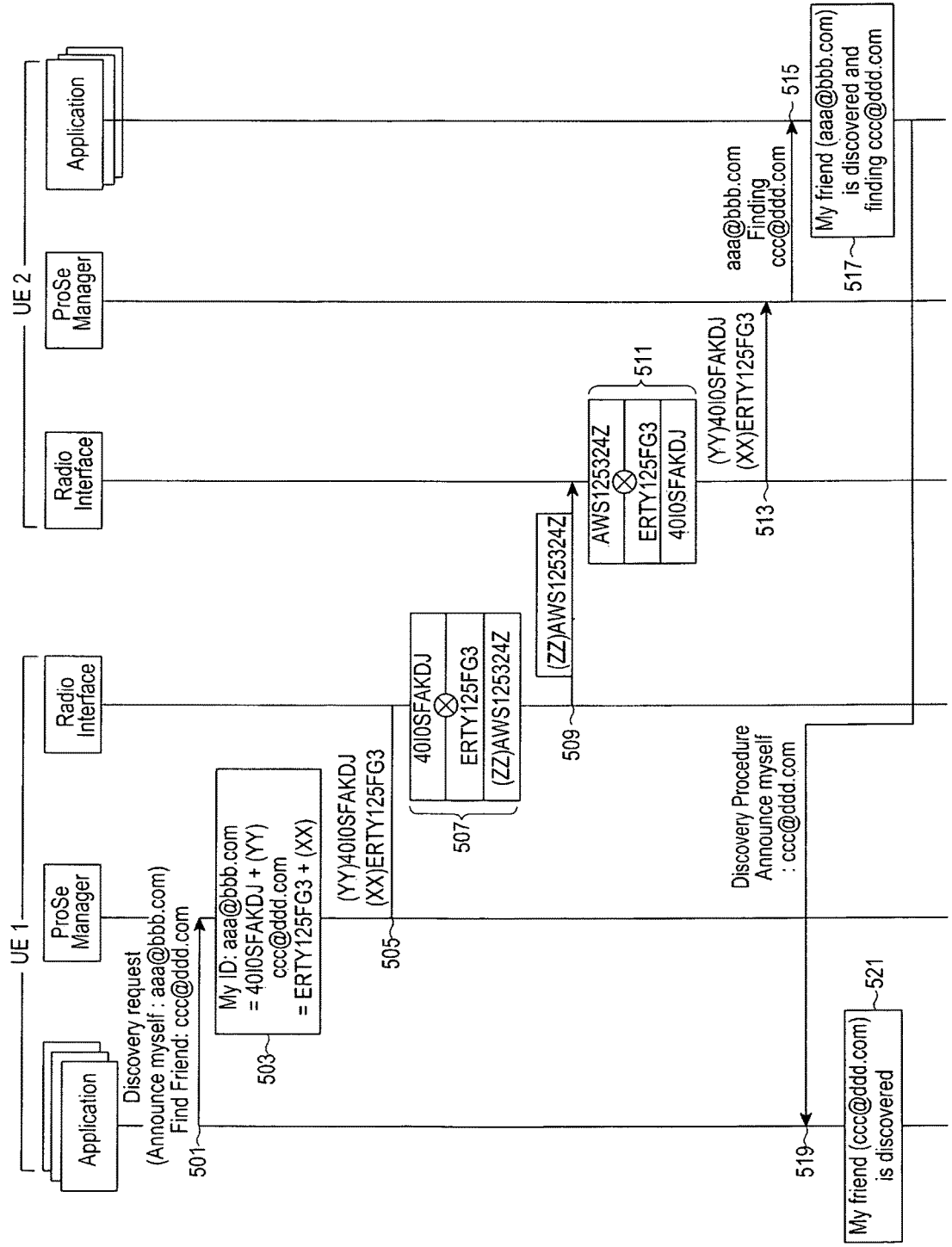
FIG. 5 illustrates a case where a UE transmits discovery information in a discovery method between UEs using application information between UEs according to a fifth embodiment of the present disclosure.

FIG. 5 illustrates a case where a UE transmits discovery information in a discovery method between UEs using application information between UEs according to a fifth embodiment of the present disclosure.

Referring to FIG. 5, in operation 507, a radio interface of a UE1 may perform the process that the ProSe manager has performed in operation 405 in FIG. 4 to make a new code using two discovery codes. Similarly, in operation 511, a radio interface of a UE2 may perform the "4010SFAKDJ" acquisition process that the ProSe manager has performed in operation 413 in FIG. 4. In other words, as for a simple operation such as XOR, it is preferable that the radio interface rather than the ProSe manager performs the XOR operation, thereby contributing to a decrease in the actual UE complexity and an increase in the processing speed. The remaining discovery method of the UE1 and the UE2 may be the same as the method in FIG. 4. Operations 501, 503, 505, 509, 513, 515, 517, 519 and 521 in FIG. 5 may be easily understood by those of ordinary skill in the art based on the description of FIG. 4. Therefore, a detailed description thereof will be omitted.

Figure 6A:
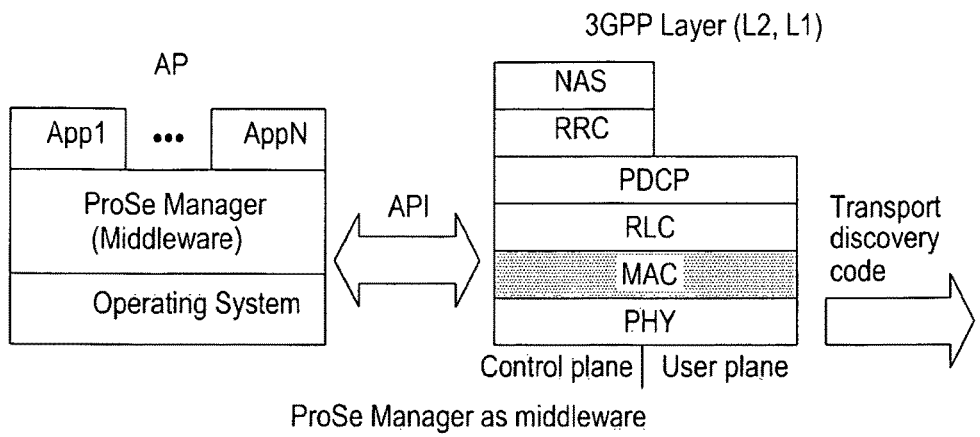
FIGS. 6A and 6B illustrate a structure of a device for providing a Proximity-based Service (ProSe service) in a UE according to an embodiment of the present disclosure.
Figure 6B:
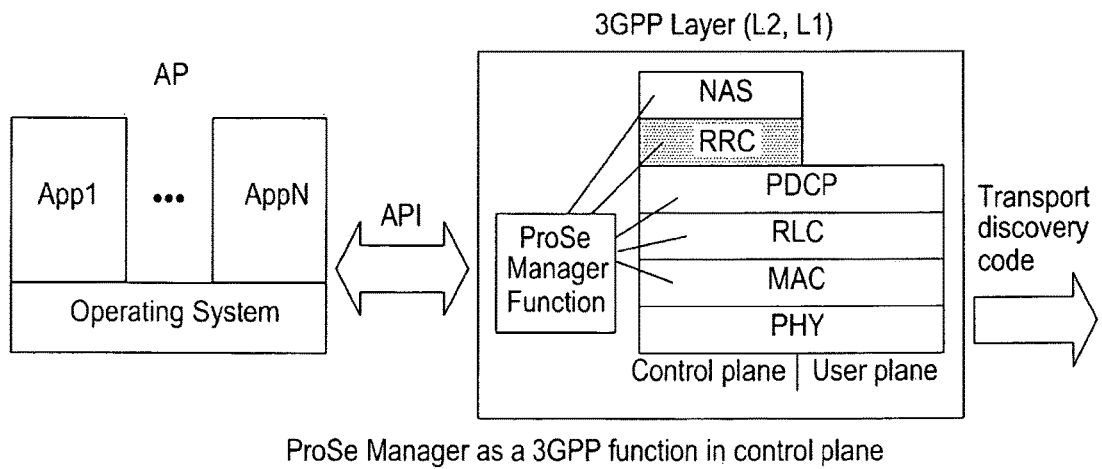

FIGS. 6A and 6B illustrate a structure of a device for providing a ProSe service in a UE according to an embodiment of the present disclosure.

Although a radio interface based on the 3GPP reference model is illustrated in FIGS. 6A and 6B, the present disclosure is not limited thereto.

Referring to FIG. 6A, a variety of application programs may be installed and executed in an Application Processor (AP), and the variety of application programs may be executed in an environment of an Operating System (OS) that drives the applications.

In various embodiments of the present disclosure, a ProSe manager in charge of a ProSe service may be driven in an intermediate program (e.g., middleware) between an application and an OS system in the AP. In other words, the ProSe manager may receive discovery information (e.g., aaa@bbb.com) from an application in the middleware, convert the received discovery information into a discovery code, and then transmit the discovery code to a 3GPP interface, which is a radio interface, using an Application Program Interface (API).

The ProSe manager may transmit the discovery code to any layer in a control plane or a user plane of 3GPP using the API. As an example, if the ProSe manager transmits the discovery code to a Media Access Control (MAC) layer in the 3GPP control plane, the MAC layer may transmit the discovery code to a wireless channel through a Physical (PHY) layer by carrying the discovery code on a payload or header of the MAC layer.

Referring to FIG. 6B, in the AP, only the application and the OS may operate, and the ProSe manager as a part of the radio interface may be implemented as one function. In FIG. 6B, the application may transmit discovery information (e.g., aaa@bbb.com) to the ProSe manager through the API, and the ProSe manager may convert the discovery information into a discovery code. The ProSe manager may be defined in any place in the 3GPP control plane and user plane. As an example, a ProSe manager function may be added to the control plane as one function of Radio Resource Control (RRC), and may operate in the form of an additional function of the existing 3GPP RRC. As another example, a ProSe layer may be configured like other functions (e.g., Non Access Stratum (NAS)) in 3GPP.

If the ProSe manager function is configured in 3GPP, the ProSe manager function may perform not only the above-described management function for the discovery codes, but also the management function for discovery and Device-to-Device (D2D) communication in 3GPP. For example, the ProSe manager function may operate as a device for performing functions such as authorization, authentication, security, ProSe service-related configuration, charging, 3GPP IDentity (ID) management and ProSe application program management and the like in a UE through communication between a network node for managing ProSe in the 3GPP network and a ProSe manager in the UE.

Figure 7:
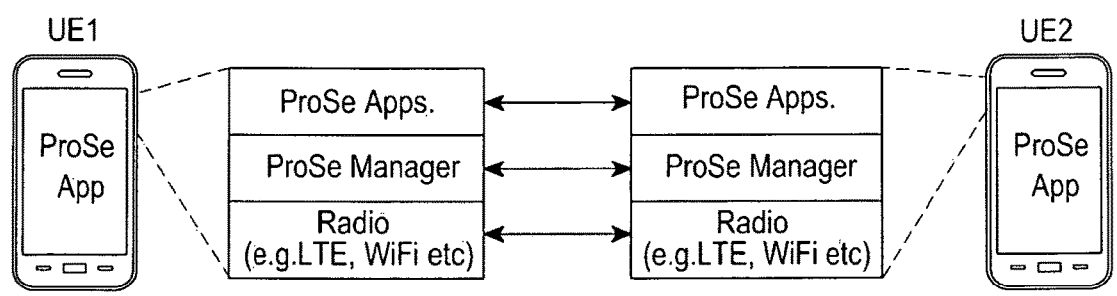
FIG. 7 illustrates the entire protocol structure in a UE according to an embodiment of the present disclosure.

FIG. 7 illustrates the entire protocol structure in a UE according to an embodiment of the present disclosure.

Referring to FIG. 7, a protocol structure in a UE may include a ProSe application layer "ProSe Apps", a ProSe management layer "ProSe Manager", and a radio layer "Radio", and information generated in each layer may have a hierarchical structure that is consumed in each layer of another user. The information of the ProSe application layer is information that users can directly view, and the information generated in the application may be transmitted to the radio layer by reprocessing the information so that the ProSe management layer may transmit the information to the radio layer, or by adding related control information to the information, and the radio layer may transmit the received information to another user through a wireless channel. A receiving user device may transmit the information received at the radio layer to the ProSe management layer, and in order to analyze the information, the receiving user device may use information stored in the user device or may be assisted by a server in the network. Through this analysis process, the ProSe management layer may deliver the information to the application layer, and the application layer may display the information on the user's screen, allowing the user to analyze the information. However, since the receiving user device does not need to display the information that is not desired by the user, for the user, the application layer, the ProSe management layer, and the radio layer may provide a filtering function capable of filtering out the information not needed for the user, thereby making it possible to provide the information needed for the user. For filtering of the receiving user device, a transmitting user device may also provide a function capable of adding or reprocessing the corresponding filtering information for each layer.

Figure 8:
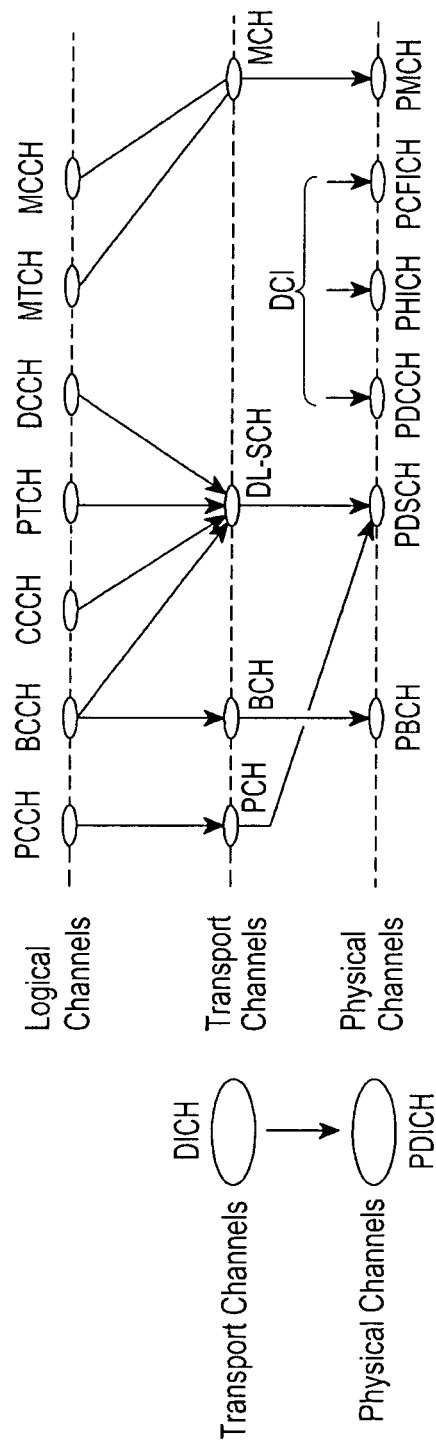
FIG. 8 illustrates an example of a channel structure for transmitting a discovery code in a 3rd Generation Partnership Project (3GPP) layer according to an embodiment of the present disclosure.

FIG. 8 illustrates an example of a channel structure for transmitting a discovery code in a 3GPP layer according to an embodiment of the present disclosure.

Referring to FIG. 8, if the ProSe manager is configured as a middleware and the MAC layer transmits the discovery code as illustrated in FIG. 6A, a DIscovery CHannel (DICH) may be newly added as one of the transport channels defined in 3GPP. In order to transmit the transport channels, Physical Discovery Channels (PDICHs), which are channels of a new physical layer, may be newly added.

If a ProSe manager function is added as one function of 3GPP like in FIG. 6B, logical channels, transport channels and physical channels, which are used in the existing 3GPP, may be reused, and may be transmitted by configuring a new channel.

Although the UE1 and the UE2 each include simple block components in FIGS. 1 to 5 for convenience of description, it will be apparent to those of ordinary skill in the art that each of the UE1 and UE2 may include a processor; a controller for collectively managing and operating by the processor not only the software layer such as the OS layer and the middleware layer, but also the hardware layer such as the radio interface; a transceiver for transmitting and receiving data under the control of the controller; a memory for storing data, information, programs, OS and the like under control of the controller; at least one storage device; an Input/Output (I/O) interface; a network interface, and other similar and/or suitable components. The processor may be implemented with a Central Processing Unit (CPU), other chipsets, a microprocessor and the like. The memory may be implemented with a medium such as a Random Access Memory (RAM) (e.g., Dynamic Random Access Memory (DRAM), Rambus DRAM (RDRAM), Synchronous DRAM (SDRAM), Static RAM (SRAM) and the like). The storage device may be implemented with hard disk, optical disk such as Compact Disk Read Only Memory (CD-ROM), CD Rewritable (CD-RW), Digital Video Disk ROM (DVD-ROM), DVD-RAM, DVD-RW disk and Blu-ray disk, and a permanent or volatile storage device such as a flash memory and various types of RAM. The I/O interface may allow the processor and/or the memory to access the storage device. The network interface may allow the processor and/or the memory to access the network.

Figure 9:
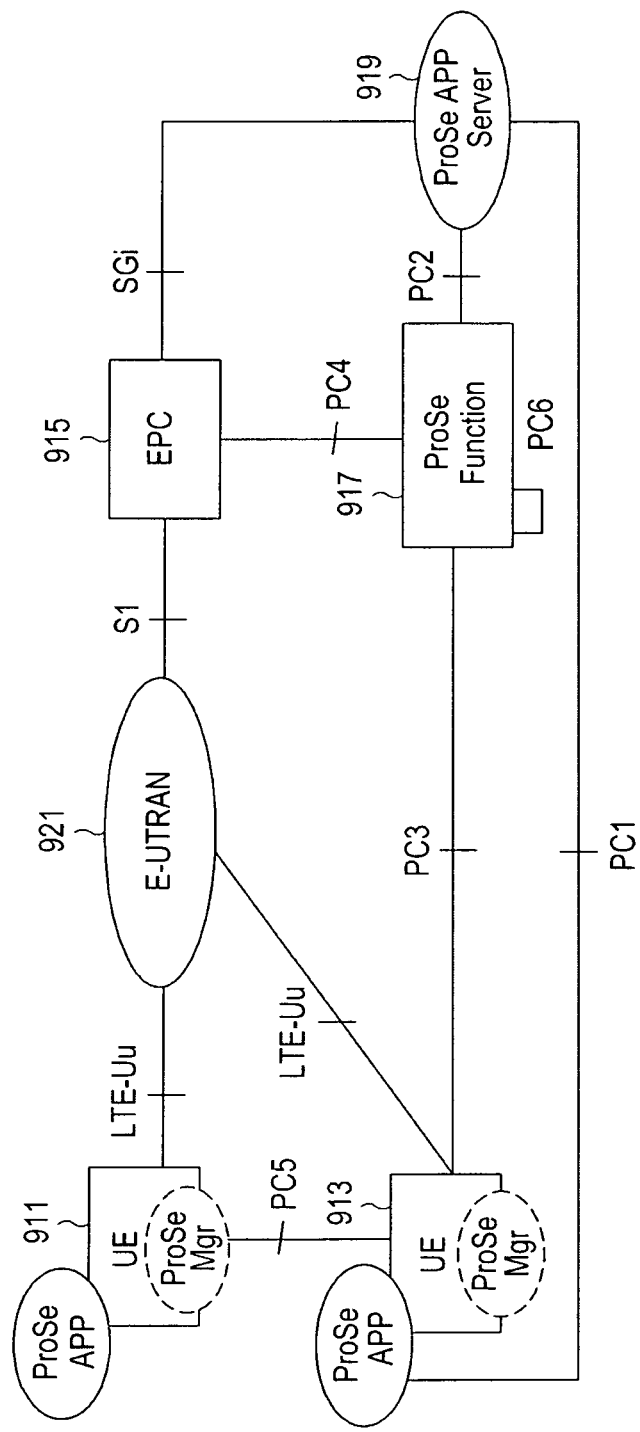
FIG. 9 illustrates a network structure including UEs each having a ProSe manager function according to an embodiment of the present disclosure.

FIG. 9 illustrates a network structure including UEs each having a ProSe manager function according to an embodiment of the present disclosure.

Although a 3GPP network structure will be considered in FIG. 9, it will be apparent to those of ordinary skill in the art that the present disclosure is not limited to the 3GPP network structure and may be applied to various other network structures.

Referring to FIG. 9, the entire network according to an embodiment of the present disclosure may include UEs 911 and 913, an Enhanced Universal Terrestrial Radio Access Network (E-UTRAN) 921, an Evolved Packet Core (EPC) 915, a ProSe function 917, and a ProSe APP server 919.

Each of the UEs 911 and 913 may include a ProSe application 'ProSe APP' for performing a ProSe manager function 'ProSe Mgr', and the UEs 911 and 913 may be connected to each other for communication, via a PC5 interface. The UEs 911 and 913 each may access the E-UTRAN 921 via an LTE-Uu radio interface. The UE 913 may access the ProSe function 917 via a PC3 interface, and the ProSe APP of the UE 913 may be connected to the ProSe APP server 919 via a PC1 interface.

The E-UTRAN 921 may be connected to the EPC 915 via an S1 interface that is defined in a 3GPP (or LTE) interface. The EPC 915 may be connected to the ProSe APP server 919 via a SGi interface that is defined in the 3GPP (or LTE) interface. Herein, the SGi interface may define a user plane and a control plane. An Internet Protocol (IP) packet forwarding protocol may be used in the user plane, and a protocol such as Dynamic Host Configuration Protocol (DHCP) and RADIUS/Diameter may be used in the control plane.

The EPC 915 and the ProSe function 917 may be connected to each other via a PC4 interface. The ProSe APP server 919 may be referred to as a server that provides applications installed, for example, in a smart phone. As an example, the ProSe APP server 919 may include a server that provides instant messenger applications such as KakaoTalk™, a server that provides applications associated with Facebook™, and a server that provides applications associated with Google™.

In the network, the ProSe manager of the UE 911 (or 913) may interact with the ProSe function, and the main roles of the ProSe manager are as follows.

The ProSe manager may include (1) a role of performing authorization for a ProSe service and ProSe service-related configuration in a UE using the ProSe function for discovery and direct communication, and (2) a role of handling ProSe identities in a UE for discovery and direct communication. Herein, ProSe identities may include all identities managed by the ProSe manager, such as 3GPP ProSe identity or/and application level identity.

Although the authorization/ProSe service-related configuration and the handling of 3GPP ProSe identity in a UE may fall within the scope of 3GPP, the handling of application level identity does not need to fall within the scope of 3GPP. Herein, the application level identity, which is ProSe service information generated in an application, may be account information that is defined in an application, such as, for example, tom@facebook.com and jack@gmail.com.

During authorization, configuration, authentication and security for a ProSe service to the ProSe manager by the ProSe function, the network operator may use subscriber-based information, or may perform authorization through authentication by means of an application vendor linked to the network operator.

Figure 10:
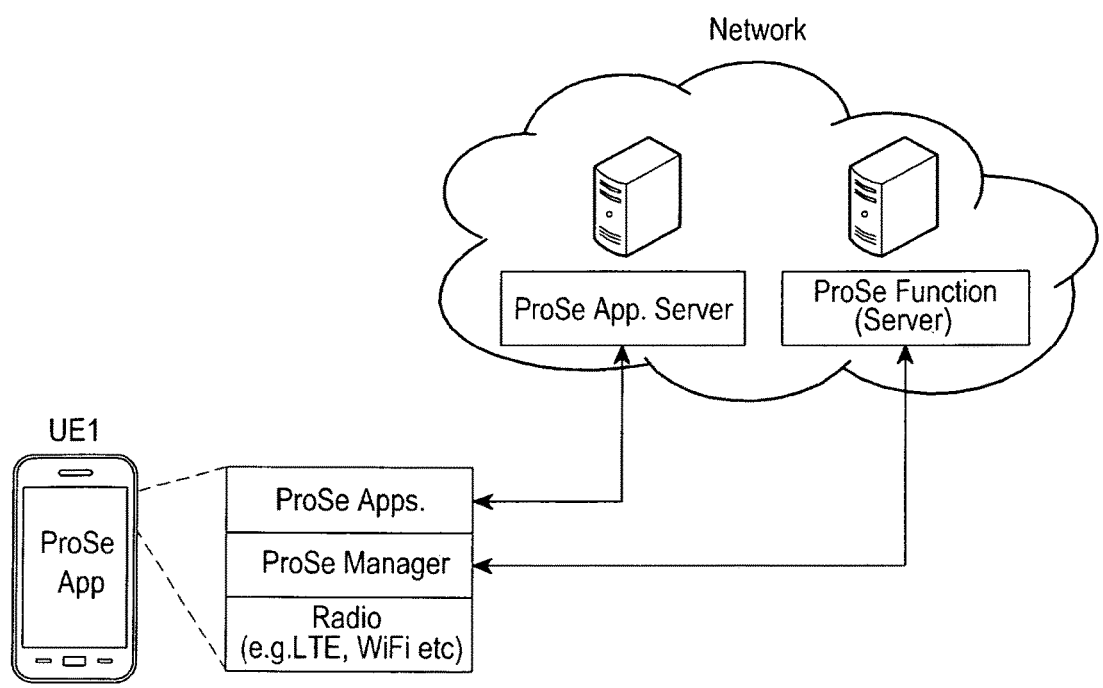
FIG. 10 illustrates a relationship between a UE and servers provided by a network according to an embodiment of the present disclosure.

FIG. 10 illustrates a relationship between a UE and servers provided by a network according to an embodiment of the present disclosure.

Referring to FIG. 10, a ProSe application in a UE may interact with a ProSe application server in the network, and a ProSe manager in the UE may interact with a management server that provides a ProSe function in the network.

Figure 11:
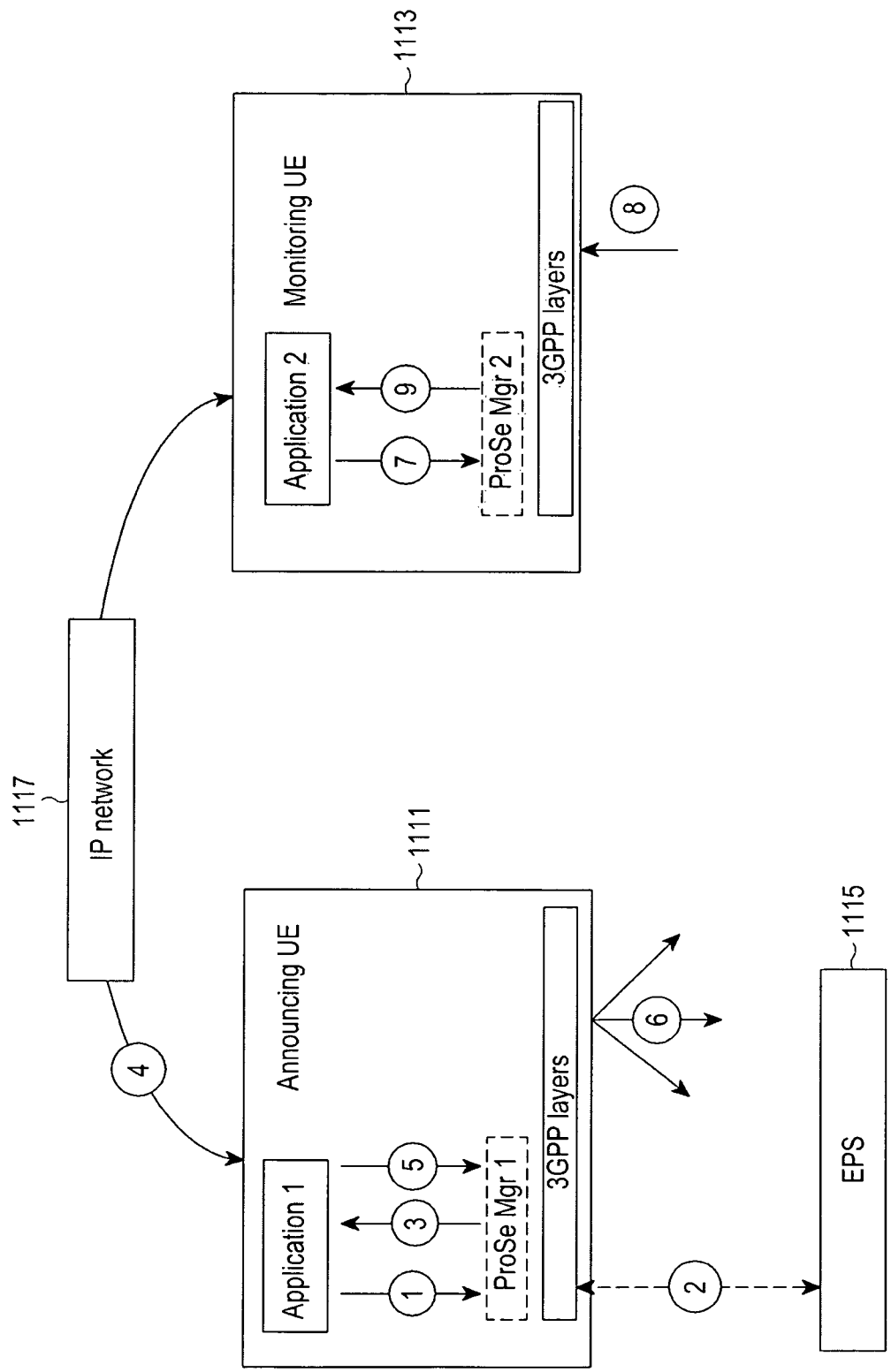
FIG. 11 illustrates a ProSe direct discovery procedure according to an embodiment of the present disclosure.

FIG. 11 illustrates a ProSe direct discovery procedure according to an embodiment of the present disclosure. Specifically, FIG. 11 illustrates a variety of related function entities and a procedure needed to perform direct discovery according to an embodiment of the present disclosure.

For a description of a ProSe direct discovery procedure according to an embodiment of the present disclosure, an announcing UE 1111 and a monitoring UE 1113, which are connected to each other via an IP network 1117, and an Evolved Packet System (EPS) 1115 are illustrated in FIG. 11.

A ProSe manager 'ProSe Mgr' in each of the UEs 1111 and 1113 may interact with a Direct Services Provisioning Function (DPF). For each of the UEs interacting with the DPF, authorization and ProSe service-related configuration performed using the ProSe function mentioned in FIG. 8 may fall within the scope of 3GPP.

Function of the ProSe manager include:

Authorization ProSe enabled-UE and 3rd party's ProSe application;

Configuration of ProSe services; and

Handling of ProSe identities.

The procedure performed in the announcing UE 1111 may be roughly divided into the following nine operations.

In operation 1, an application 1 may request allocation of an expression code from a ProSe manager in the UE. Herein, the expression code, which is a value obtained by converting the application level identity into a format of a code such as a binary, may be expressed as, for example, jack@facebook.com→1010010101 (Expression Code).

In operation 2, the expression code may be allocated to the ProSe manager 'ProSe Mgr 1' in the UE 1111. The ProSe manager 'ProSe Mgr 1' may directly allocate. Alternatively, the ProSe manager 'ProSe Mgr 1' may receive an expression code by requesting the expression code from the EPS 1115, and allocate the received expression code. This operation may be performed only once at the time the expression code is allocated.

In operation 3, if the expression code is allocated, the ProSe manager may provide the allocated expression code to the application 1 of the announcing UE 1111.

In operation 4, the application 1 of the announcing UE 1111 may announce the expression code allocated from the ProSe manager 'ProSe Mgr 1' to the parties of interest using an application layer mechanism. Herein, the parties of interest may correspond to UEs of the users to which the announcing UE 1111 desires to announce the presence of the UE 1111, such as acquaintances or friends of the user of the announcing UE 1111. In the case of an application program defined in 3GPP, the procedure of Step 4 is needed, and in the case of open discovery (e.g., an expression code shared by all people), this procure may not be needed.

In operation 5, if the announcing UE 1111 desires to announce (or transmit) the expression code, the application 1 of the announcing UE 1111 may initiate the announcement through the ProSe manager 'ProSe Mgr 1', and transmit the expression code through the 3GPP layer.

In operation 6, the announcing UE 1111 may broadcast the expression code, and periodically repeat the broadcasting operation for a predetermined time.

In operation 7, the monitoring UE 1113 may receive a command to monitor an expression code from the announcing UE 1111, from its application 2 through a ProSe manager 'ProSe Mgr 2'.

In operation 8, the monitoring UE 1113, which is a terminal that has been authenticated to perform a discovery operation, may detect the expression code in the ProSe manager.

In operation 9, the ProSe manager of the monitoring UE 1113 may deliver the detected expression code to the application 2.

As is apparent from the foregoing description, according to the present disclosure, UEs may efficiently exchange discovery information in a wireless communication system.

In addition, according to the present disclosure, UEs may directly communicate with each other in a wireless communication system.

As described above, embodiments of the present disclosure may be provided in a form of program commands executable through various computer means and recorded in a non-transitory recording media readable by a computer. Here, the non-transitory recording media readable by a computer may include a program command, data file, data structure, and any combination thereof. In the meantime, the program command recorded in the non-transitory recording media may be one specially designed for the embodiments of the present disclosure or one disclosed in the art of computer software. The non-transitory recording media readable by a computer may include hardware devices specially designed to store and execute programs such as magnetic media (hard disk, floppy disk, and magnetic tape), optical media (Compact Disc-Read Only Memory (CD-ROM) and Digital Versatile Disc (DVD)), magneto-optical media (floptical disk), Read Only Memory (ROM), Random Access Memory (RAM), and flash memory. Further, the program command may include a high level language code executable by a computer having an interpreter as well as a machine language code provided by a complier. The hardware device may be configured with at least one software module to perform operations according to various embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for communicating with a second user equipment (UE) by a first UE in a wireless communication system, the method comprising:

generating, by a processor in the first UE, a first discovery code by converting first identification information identifying the first UE;

generating, by the processor, a second discovery code by converting second identification information identifying the second UE;

attaching, by the processor, first additional information to the first discovery code, wherein the first additional information is information distinguishing the first discovery code from the second discovery code;

attaching, by the processor, second additional information to the second discovery code, wherein the second additional information is information distinguishing the second discovery code from the first discovery code;

combining the attached first discovery code and the attached second discovery code into a single code;

directly delivering, by the processor, the combined single code to a media access control (MAC) layer of a communication reference model in the first UE, by bypassing at least one layer of the communication reference model above the MAC layer;

transmitting, by a transceiver of the first UE, a signal including the combined single code to the second UE; and identifying, by the processor, a presence of the second UE by receiving, from the second UE, the second identification information in response to the transmitted signal, wherein the first identification information comprises user account information of the first UE defined by an executing application of the processor in the first UE, and wherein the second identification information comprises user account information of the second UE defined by the executing application of the processor in the first UE.

2. The method of claim 1, wherein the combining comprises combining the attached first discovery code and the attached second discovery code into the single code using an exclusive or (XOR) operation.

3. The method of claim 1, wherein the combined single code includes identification information indicating a combination of the first discovery code and the second discovery code.

4. At least one non-transitory processor readable medium storing a computer program of instructions configured to be readable by a processor for instructing the processor to execute a computer process for performing the method of claim 1.

5. The method of claim 1,
wherein the first discovery code and the second discovery code are generated by converting the user account information into a code in a binary format.

6. The method of claim 1,
wherein the first additional information and the second additional information are attached in front of the first discovery code and in front of the second discovery code respectively.

7. The method of claim 1, wherein the transmitting of the signal including the combined single code to the second UE comprises broadcasting the signal periodically in a predetermined time.

8. An apparatus for communicating with a second user equipment (UE) by a first UE in a wireless communication system, the apparatus comprising:
a processor configured to:
generate a first discovery code by converting first identification information identifying the first UE,
generate a second discovery code by converting second identification information identifying the second UE,
attach first additional information to the first discovery code, wherein the first additional information is information distinguishing the first discovery code from the second discovery code,
attach second additional information to the second discovery code, wherein the second additional information is information distinguishing the second discovery code from the first discovery code,
combine the attached first discovery code and the attached second discovery code into a single code, and
directly deliver the combined single code to a media access control (MAC) layer of a communication reference model in the first UE, by bypassing at least one layer of the communication reference model above the MAC layer; and
a transceiver configured to transmit a signal including the combined single code to the second UE,
wherein the processor is further configured to identify a presence of the second UE by receiving, from the second UE, the second identification information in response to the transmitted signal,
wherein the first identification information comprises user account information of the first UE defined by an executing application of the processor in the first UE, and
wherein the second identification information comprises user account information of the second UE defined by the executing application of the processor in the first UE.

9. The apparatus of claim 8, wherein the processor is further configured to combine the attached first discovery code and the attached second discovery code into the single code using an exclusive or (XOR) operation.

10. The apparatus of claim 8, wherein the combined single code includes identification information indicating a combination of the first discovery code and the second discovery code.

11. The apparatus of claim 8,
wherein the first discovery code and the second discovery code are generated by converting the user account information into a code in a binary format.

12. The apparatus of claim 8,
wherein the first additional information and the second additional information are attached in front of the first discovery code and in front of the second discovery code respectively.

13. The apparatus of claim 8, wherein the transceiver is further configured to broadcast the signal periodically in a predetermined time.

* * * * *